UNITED STATES PATENT OFFICE.

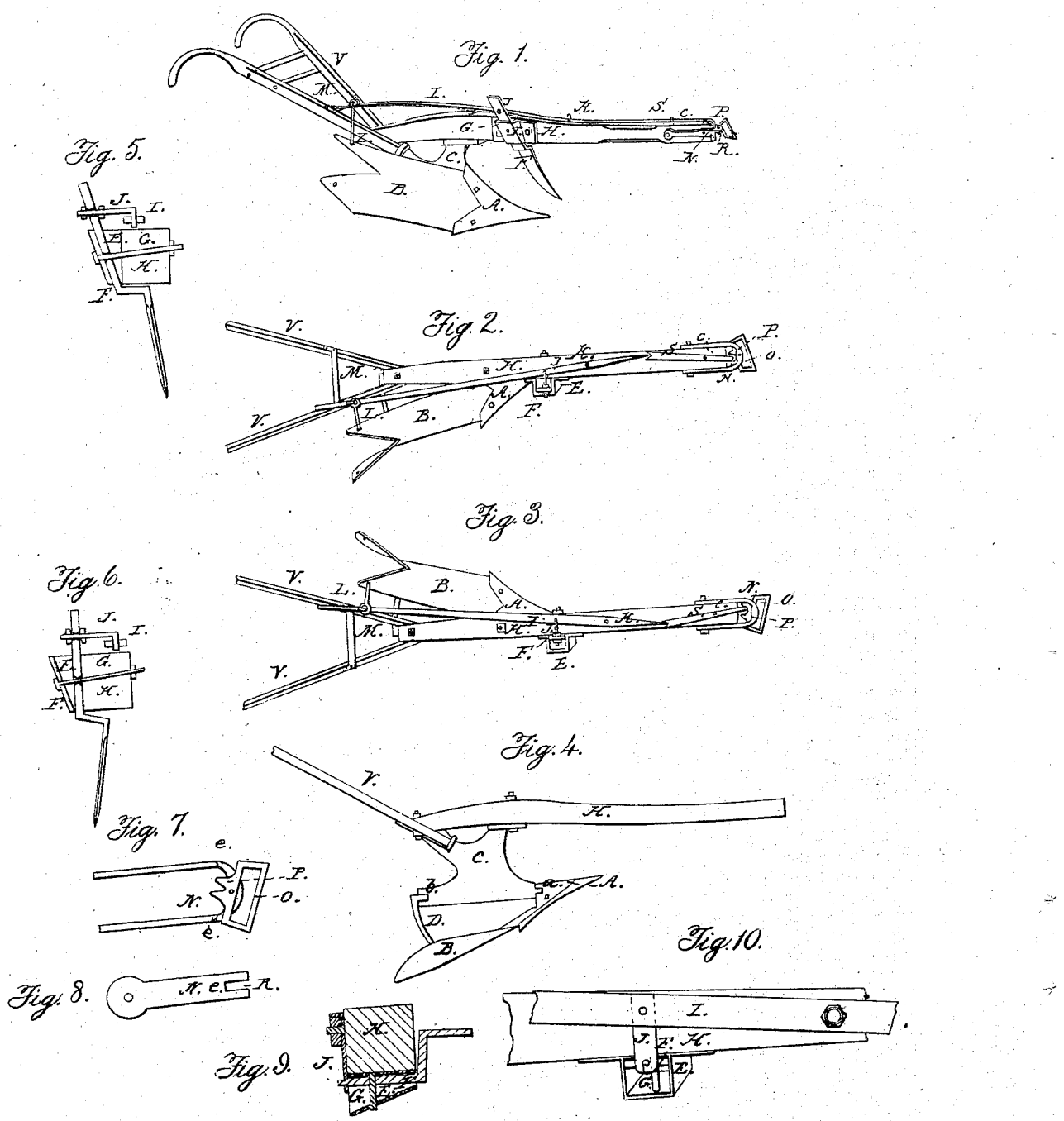

HENRY S. AKINS, OF SPEEDSVILLE, NEW YORK.

IMPROVEMENT IN HILLSIDE-PLOWS.

Specification forming part of Letters Patent No. 21,306, dated August 31, 1858.

*To all whom it may concern:*

Be it known that I, HENRY S. AKINS, of Speedsville, in the county of Tompkins and State of New York, have invented a new and useful Improvement in Reversible Plows, of which the following is a full, clear, and exact description, reference being had to the accompanying drawings, making part of this specification, in which—

Figure 1 represents a view in perspective, showing the plow in the proper position for turning a right-hand furrow; Fig. 2, a top view of the plow in the same position as represented in Fig. 1; Fig 3, a top view of the plow in the proper position for turning a left-hand furrow; Fig. 4, side elevation, the mold-board being unhooked; Fig. 5, a section through the clasp E; Fig. 6, a similar view of the same, showing the colter in a different position; Fig. 7, a detail view of the two clevises; Fig. 8, a side view of the plow-clevis; Fig. 9, a modification of clasp and colter, and Fig. 10 a top view of the same.

To enable others skilled in the art to make, construct, and use my improvement, I will now proceed to describe it in detail.

In the accompanying drawings, A represents the reversible share; B, a double-faced reversible mold-board, being divided in the rear end into two faces, each face being twisted into the shape required for turning furrows, and each in the opposite direction from the other, as shown in Figs. 2 and 3.

C is the landside, being provided with a pivot, *a*, on the forward end, which is inserted in the under side of the mold-board, and a hole in the rear end for the pivot *b* on the brace D.

E is the clasp for holding the colter F, into which said colter is introduced from the under side. The clasp is wider at the top than at the bottom in the direction transverse to the beam, as shown in the sectional drawings in Fig. 5, for the purpose of allowing the colter to vibrate, its center of motion being the bottom of the clasp.

As it is desirable in plowing that the colter should cut farther on the land than the share—that is, that it should be at a greater distance than is the upright edge of the share from the furrow last plowed—it is therefore necessary, in order to produce this result in reversible plows, that the colter should be adjustable. Otherwise it would necessarily be made stationary in the center of the beam, and would cut on the inside or furrow side of the share, which is the manner in which reversible plows are commonly constructed and used, but is not as good as with the colter adjustable.

The bolt G is for the purpose of holding the colter in its proper position vertically, and is fitted loosely through the colter in order that the colter may move freely upon it. The colter being fastened to one side of the beam H, it is necessarily bent, as shown in Figs. 5 and 6, in order that its lower or cutting part shall be thrown equally as far from one side of the longitudinal center of the plow as the other. The colter is adjusted for either by the lever I, to which it is attached by the crooked bolt J, which passes through both the colter and lever, as shown in Figs. 5 and 6; or it may be attached in any other manner that will answer the purpose of reversing and holding the colter.

The lever I vibrates on a pin, K, which is fastened to the beam. The rear end of the lever rests upon a support, M, which is fastened to the handles V and V' and vibrates between the handles, and is held by the hook L firmly against the handles or their equivalent. The hook L is attached by a loose joint to the lever I, and hooks into and fastens to its respective positions the mold-board, as seen in Figs. 1, 2, and 3.

It is desirable in plowing, more especially in side-hill plowing, where the plow has a continual tendency to slide down the hill, which is usually away from the unplowed land, that the plow should have a side draft, in order to turn the point of the share more toward the unplowed land. This result I could not produce in a reversible plow without making the draft adjustable, for which purpose I have constructed an apparatus which consists of two clevises, the plow-clevis N and the chain-clevis O being fastened together by the pin P, on which the chain-clevis vibrates in the slot R in the plow-clevis. The chain-clevis rests alternately against the heads *e* and *e* of the slot. The forward part of the chain-clevis being inclined, as shown in the drawings, the draft-chain will be drawn into the most extended corner thereof, thereby producing the side draft. The construction of the clevises can be best seen at Fig. 7, in which that part of the clevis directly over the slot is removed, and Fig. 8, which shows one side of the plow-clevis. The chain-clevis is reversed by the lever S, which vibrates on a pin, c, and is operated by the lever I, which reaches forward from its center of motion and into the fork in the rear end of the lever S. The lever S is bent downward over the end of the beam, as shown in Fig. 1, and passes between two projections on the rear side of the chain-clevis, by which means the chain-clevis is reversed when the lever S is operated.

It will be seen from the foregoing description and the drawings that the act of moving the hook which fastens the mold-board from one side to the other reverses both the colter and chain-clevis. The operation of reversing the plow is as follows: The hook should be unhooked from the mold-board and the mold-board turned down to the position represented in Fig. 4, and raised up on the side opposite to that which it occupied before. The hook should then be drawn over to the side on which the mold-board is and hooked in the mold-board. The plow will then be completely reversed and in the position to turn a furrow in the opposite direction to the one last turned.

I do not claim broadly the combination of the reversible mold-board with the adjustable colter; but

I claim—

1. The reversible mold-board and colter in combination with a reversible clevis, in the manner and for the puposes substantially as described.

2. Attaching the hook L to the lever I, which operates the colter F, thereby making the operation of reversing the hook, adjusting the colter, and fastening both the mold-board and colter in their respective positions by one and the same hook and at one operation, as set forth.

3. The reversible chain-clevis O, for the purpose of producing reversible side draft, when constructed and operated in the manner substantially as described.

In testimony whereof I have hereunto set my hand.

HENRY S. AKINS.

Witnesses:
E. S. FARNHAM,
A. F. TANNER.